United States Patent [19]

Brister et al.

[11] Patent Number: 4,522,672

[45] Date of Patent: Jun. 11, 1985

[54] COMPOSITE LABEL WEB AND METHOD OF MAKING AND METHOD OF APPLYING LABELS

[75] Inventors: Eneas E. Brister, Fairborn; Frederick P. Williams, Kettering, both of Ohio

[73] Assignee: Monarch Marking Systems, Inc., Dayton, Ohio

[21] Appl. No.: 469,185

[22] Filed: Feb. 24, 1983

Related U.S. Application Data

[62] Division of Ser. No. 238,505, Feb. 26, 1981, Pat. No. 4,390,577.

[51] Int. Cl.$^3$ .......................... B44C 1/16; B32B 31/00; B65C 9/18; B41F 1/08

[52] U.S. Cl. .................................... 156/238; 156/240; 156/249; 156/277; 156/289; 156/344; 156/384; 156/540; 156/DIG. 33; 101/288

[58] Field of Search ................. 428/42, 134, 137, 914; 40/2 R; 156/268, 577, DIG. 33, 247, 277, 249, 344, 238, 187, 289, 270, 230, 240, 384, 540; 101/288

[56] References Cited

U.S. PATENT DOCUMENTS

| | | | |
|---|---|---|---|
| 2,213,666 | 9/1940 | Burke | 40/2 R |
| 2,620,205 | 12/1952 | Vogt . | |
| 2,636,297 | 4/1953 | Johnson | 40/2 R |
| 3,503,834 | 3/1970 | Schröter | 40/2 R |
| 3,706,626 | 12/1972 | Smith et al. | 156/268 |
| 3,767,039 | 10/1973 | Schröter . | |
| 3,783,083 | 1/1974 | Jenkins . | |
| 4,191,608 | 3/1980 | Bussard et al. | 156/DIG. 33 |

FOREIGN PATENT DOCUMENTS

| | | |
|---|---|---|
| 2414541 | 10/1978 | Fed. Rep. of Germany . |
| 1111851 | 5/1968 | United Kingdom . |
| 1272305 | 4/1972 | United Kingdom . |
| 1378142 | 12/1974 | United Kingdom . |
| 2012245 | 6/1978 | United Kingdom . |
| WO79-499 | 8/1979 | United Kingdom . |
| 2025896 | 1/1980 | United Kingdom . |
| 1596466 | 8/1981 | United Kingdom . |
| 1603581 | 11/1981 | United Kingdom . |

*Primary Examiner*—Edward Kimlin
*Assistant Examiner*—Louis Falasco
*Attorney, Agent, or Firm*—Joseph J. Grass

[57] ABSTRACT

There is disclosed a composite label web and method of making and method of applying labels. The composite label web comprises a longitudinally extending carrier web and label material releasably adhered by pressure sensitive adhesive to the carrier web. There are cuts extending across the label material at longitudinally spaced intervals to provide adjacent labels having complementary leading and trailing edges defining a forwardly projecting portion and a rearwardly projecting portion. In dispensing the label from the carrier web, the forwardly projecting portion is gradually delaminated. It is preferred that only a part of the rearwardly projecting portion of the leading label which has been dispensed to a label applying position remain adhered to the carrier web and that only a part of the forwardly projecting portion of the next successive label be delaminated from the carrier web.

7 Claims, 8 Drawing Figures

COMPOSITE LABEL WEB AND METHOD OF MAKING AND METHOD OF APPLYING LABELS

CROSS-REFERENCE TO RELATED APPLICATION

This is a division of application Ser. No. 06/238,505, filed Feb. 26, 1981, now U.S. Pat. No. 4,390,577, granted June 28, 1983.

BACKGROUND OF THE INVENTION

1. Field of the Invention

This invention relates to the art of composite label webs and to method of making and to method of applying labels.

2. Description of the Prior Art

U.S. Pat. No. 2,213,666 to L. J. Burke granted Sept. 3, 1940 discloses die cut pressure sensitive labels arranged in book form and having complementary die cuts. U.S. Pat. No. 2,620,205 to C. W. Vogt discloses a web with lateral slits which aid in web position adjustment. U.S. Pat. No. 3,503,834 to C. Schroter granted Mar. 31, 1970 discloses a composite label web having wavy side edges. U.S. Pat. No. 3,767,039 to C. Schroter granted Oct. 23, 1973 discloses a sectionally subdivided bilateral sticker tape roll. U.S. Pat. No. 3,783,083 to W. A. Jenkins granted Jan. 1, 1974 discloses a hand-held labeler of a type adapted to dispense labels from a composite label web. A composite label web in roll form is advanced through the labeler stepwise. The labels have straight leading and trailing edges made by butt cuts which are perpendicular to the longitudinal extent of the carrier web. A label is brought to a printing position where the label is printed with selected indicia. The label remains completely adhered to the carrier web at the printing position. Thereafter, the just printed label is advanced to a label applying position under the applicator roll. When the leading edge of the just printed label reaches the place of label separation at the delaminator, its entire leading edge must simultaneously separate or delaminate from the carrier web. There is considerable resistance to delamination and the separation or delamination force is at a peak. When there is "cold flow" of the adhesive at leading side edges of the label, an additional amount of separation force is required at this peak. This considerable resistance at the start of delamination is a contributing factor to breakage of the barrier web both at the delaminator and at the places with the drive teeth engage the carrier web. The high forces required to delaminate the entire leading edge of a label at the same time must be overcome by correspondingly high forces of the web advancing mechanism. There is also the tendency of the label to resist delamination to such an extent that the label sometimes tends to follow the carrier web about the delaminator. When the just printed label has been advanced to the label applying position, the trailing marginal edge of the printed label remains adhered to the carrier web until the printed label is pressed onto the item to be labeled and the printed label is pulled away from the carrier web. In the Jenkins patent, a wide composite web is provided with feed and butt cuts and finally the wide composite web is slit into a plurality of narrow composite label webs which are wound into rolls. The butt cuts which define the leading and trailing edges of the labels are straight and extend across the wide composite label web along a lateral line perpendicular to the longitudinal extent of the web. These cuts are made by straight knives of the rotary cutter. Each time these straight knives cut the wide composite web laterally, there is a sudden peak in the cutting force required to make the lateral cut and the force is distributed over the entire edge of the knives. This is less than desirable when cutting cloth labels that are required to be dispensed in a hand-held labeler. Uncut fibers resulting from incomplete severing at end edges of the labels are intolerable because such fibers prevent reliable label delamination.

German Offenlegungsschrift No. 24 14 541 to H. P. Ast dated Oct. 9, 1975 discloses a composite label web of fully die cuts spaced labels having contoured leading and trailing edges.

U.S. Pat. No. 3,706,626 to Thomas M. Smith et al granted Dec. 19, 1972 discloses a composite label web for use in a computer printer in which lateral or transverse butt cuts are made in the label material along lines perpendicular to the longitudinal direction. Such butt cuts were sometimes made along straight lines which were very slightly inclined with respect to the perpendicular to distribute the cutting forces on the rotary cutter.

SUMMARY OF THE INVENTION

The invention relates to a method of making a low-cost composite label web, to the composite label web per se and to a method of printing and applying labels from such a composite label web. The invention provides a composite label web which can be used in a labeler, particularly a hand-held labeler, and which has advantages over the prior art and yet is low in cost. The composite label web of the invention instead of having straight butt cuts which lie along a line perpendicular to the longitudinal extent of the carrier web, has butt cuts at least a portion of which are inclined with respect to such a perpendicular. The butt cuts provide leading and trailing edges wherein the leading edge of one label is adjacent to and complementary with the trailing edge of an adjacent label. The butt cuts result in such label having a leading portion and a trailing portion. Although butt cuts can be configured which have a wide variety of shapes within the scope of the invention, it is preferred that the butt cuts are non-rectlinear along from one side edge of the label material to the other side edge, and thus according to a preferred embodiment the leading edge of the label defines a single forwardly projecting portion disposed generally centrally of the side edges of the label material and a pair of rearwardly projecting portions disposed adjacent the side edges of the label. If desired, the leading edge can define more than one forwardly projecting portion in which event the trailing edge could be a complement and could have more than one rearwardly projecting portion. The use of plural forwardly projecting portions is more advantageous with wider labels. The label material is coextensive in width with the carrier web and the butt cuts do not result in any material being removed, thereby obviating waste of label material. The composite label web is wound into a roll adapted to be used in a hand-held labeler so that the leading edges of the labels are closer to the outer free end of the carrier web than the respective trailing edges. When a label is at rest at a printing position in a labeler with a part of the label partly delaminated from the carrier, further delamination is greatly facilitated. During stepwise advance of the carrier web, the remainder of the forwardly projecting portion of the label is gradually delaminated and label delamination continues until all but a part of the rearwardly projecting is delaminated from the carrier web. The forwardly projecting portion of the next successive label on the carrier web is now also partly delaminated from the carrier web, and it also will be easy to further delaminate. An advantage of the invention resides in the fact that a longer label can be produced without increasing the area of the label. A longer label is easier to apply using an applicator especially in instances which the shape of the item to be labeled is less than ideal for labeling purposes. Also the contours of the leading and trailing edges can indicate the front and rear of the label, which is useful in visually discerning 99 from 66 for example. Because labels of the composite label web of the invention are easy to delaminate in a hand-held labeler, a wider variety of adhesives and release coatings can be used without affecting the reliability of delamination. Also the labels can be more flexible because the tendency of the labels to follow the carrier web about the delaminator is reduced. It is especially important in labeling frozen food packages to have labels that are quite flexible so that as much of the label as possible can adhere to the packages. The reliability of butt cutting when using rotary cutters is also increased. By using a contoured cutter blade as in the preferred embodiment, the cutting force is concentrated at the place where the cutting action occurs. Therefore, the butt cutting is performed more reliably as is especially important when butt cutting cloth label material or label material which is tougher than paper material such as is used in the pricemarking field.

In this embodiment, any cold flow into the butt cuts is beneficial because the adhesive tends to hold the leading label at the proper attitude with respect to the label applicator at the label applying portion.

In another embodiment, the butt cuts are rectilinear, but the feed cuts are positioned in a predetermined arrangement relative to the butt cuts so that when a label is at the printing position adjacent the delaminator only a part of the forwardly projecting portion is delaminated from the carrier web and when that label is advanced to the label applying position only a part of the rearwardly projecting portion remains adhered to the carrier web.

Other advantages and features of the invention will be apparent to those skilled in the art from the following detailed description and the accompanying diagrammatic drawings.

DETAILED DESCRIPTION OF THE PREFERRED EMBODIMENTS

Figure 1:
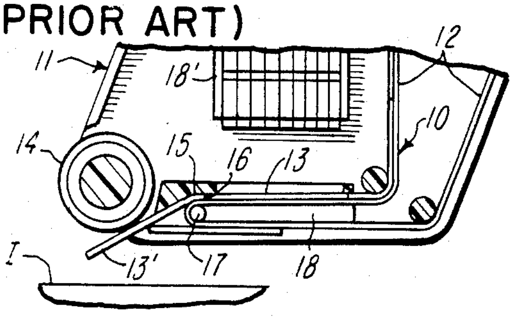
FIG-1 (PRIOR ART)
FIG. 1 is a fragmentary view of a labeler and a prior art composite label web with a leading label being shown at a label applying position relative to an applicator, with the next successive label being at a printing position.
Figure 2:
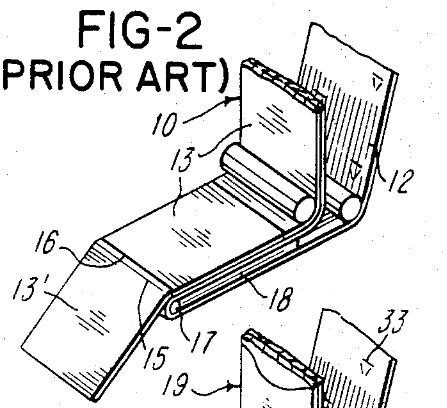
FIG-2 (PRIOR ART)
FIG. 2 is a diagrammatic perspective view of a prior art composite label web in relation to a delaminator with the trailing marginal edge of the label shown adhered to the carrier web.
Figure 4:
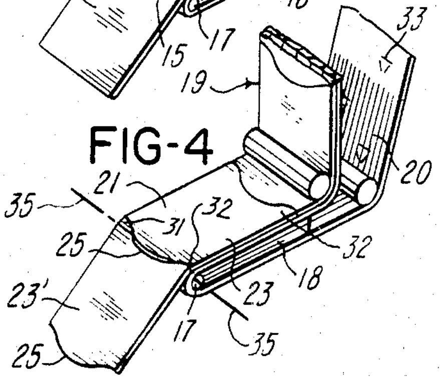
FIG. 4 is a diagrammatic perspective view similar to FIG. 2, but showing the composite label web in accordance with the invention.
Figure 5:
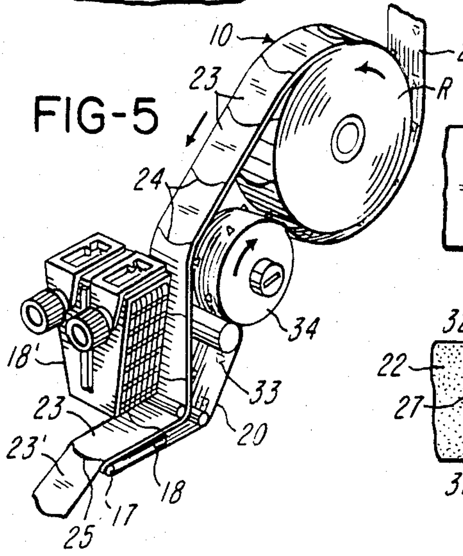
FIG. 5 is a diagrammatic view showing the path of the composite label web and its carrier web in a hand-held labeler of the type disclosed in U.S. Pat. No. 3,783,083.
Figure 6:
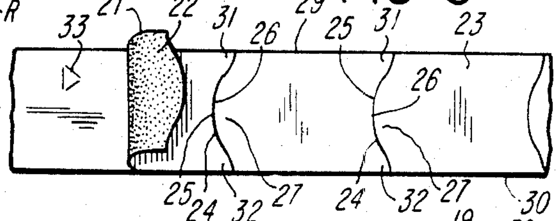
FIG. 6 is a fragmentary top plan view of the composite label web shown in FIGS. 3, 4 and 5, with a portion of one label being peeled back to expose the adhesive on its underside.
Figure 7:
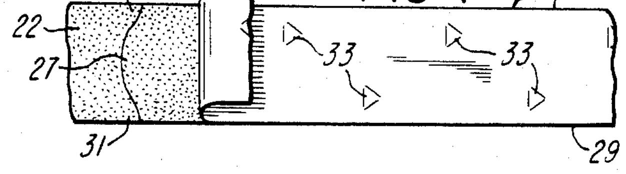
FIG. 7 is a bottom plan view of the composite label web shown in FIGS. 3–6, with part of the carrier web peeled back.

With reference initially to FIGS. 1 and 2 which discloses a prior art composite label web 10 in relation to a hand-held labeler 11 of the type disclosed in U.S. Pat. No. 3,783,083. The composite label web 10 has a carrier web 12 and labels 13 releasably adhered by pressure sensitive adhesive (not shown) to the carrier web 12. The leading label, indicated at 13′, is shown to be in label applying relationship with respect to an applicator 14 of the labeler 11. The trailing marginal end 15 of the label 13′ is shown to be adhered to the carrier web 12. The leading end 16 of the next successive label 13 is shown to be completely adhered to the carrier web 12 because the leading end 16 is adjacent a delaminator but is spaced rearwardly of the place or line at which the label 13 will separate from the carrier web 12. It is apparent that when the label 13 starts to separate or delaminate from the carrier web 12 at delaminator 17, the entire leading edge 16 will separate at the same time because the leading edge 16 lies along a line perpendicular to the longitudinal extent of the carrier web 12. The label 13 is at a printing position between the platen 18 and a print head 18′. The label 13 can be applied to an item I by moving the labeler 11 relatively toward the item I and pressing the leading label 13′ by means of the applicator 14 onto the item I. While applying the leading label 13′, its trailing marginal end 15 can be pulled away from the carrier web 12. Once the label 13 has been printed at the printing position, the label 13 can be advanced stepwise into the label applying position and applied to an item. With reference to FIGS. 6 and 7, there is shown a composite label web 19 in accordance with the invention. The composite label web 19 is shown to comprise a carrier web 20 having a release coating on its upper surface and label material 21 releasably adhered by pressure sensitive adhesive 22 on its underside to the release coating on the carrier web 20. The label material 21 is shown to be coextensive in width with the carrier web 20. The label material 21 is shown to be divided into a series of labels 23 disposed longitudinally of the carrier web 20 by means of butt cuts generally indicated at 24 which extend across the label material 21. The cuts 24 do not extend through the carrier web 20 because the carrier web 20 is used to carry the labels to the delaminator 17. The butt cuts 24 sever the label material 21 without removing any of the label material 21. A single butt cut 24 simultaneously forms the leading edge 25 of one label and the trailing edge 26 of an adjacent label. The butt cuts 24 are illustrated as being non-rectilinear, specifically as having a wavy configuration comprised of a continuous curve. As shown, at least a portion of each butt cut 24 is inclined with respect to a line perpendicular to the longitudinal extent of the carrier web 20. In the embodiment shown, each label 23 has a forwardly projecting portion 27. The forwardly projecting portion 27 is shown to be disposed generally centrally between side edges 29 and 30 of the label material 21. Each label 23 also has a pair of rearwardly projecting portions 31 and 32 disposed adjacent respective side edges 29 and 30. The carrier web 20 is shown to be provided with feed cuts 33 having a predetermined relationship with respect to the butt cuts 24 to bring the label 23 into proper registration with the printing position, the label applying position, and the delaminator 17. The feed cuts 33 are engageable with teeth of a toothed feed wheel 34 to pull the composite label web 19 from the roll R. The drive mechanism for the labeler 11 advances the carrier web 20 stepwise. It is preferred to advance the leading label 23' to a position in which only a part of each rearwardly projecting portion 31 and 32 remains adhered to the carrier web as shown in the disclosure. A straight phantom line 35 in FIG. 4 shows the place of label separation. It is apparent from FIG. 4 that the rearwardly projecting portions 31 and 32 still adhere to the carrier web 20 and that a part of the forwardly projecting portion 27 of the next successive label 23 extends beyond the line of separation and has been delaminated from the carrier web 20. Because of delamination of a part of the forwardly projecting portion of the label 23 in FIGS. 4 and 5, the leading edge 25 of the label 23 is shown as extending outwardly and away from the carrier web 20.

Figure 3:
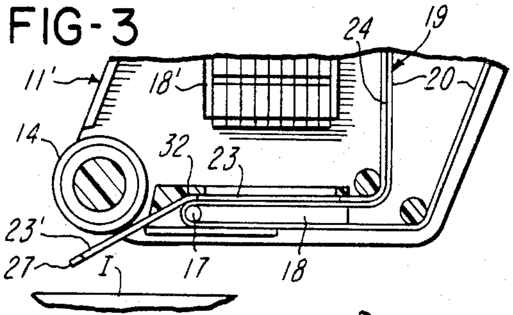
FIG. 3 is a view similar to FIG. 1, but showing a composite label web in accordance with the invention.

Comparing FIGS. 1 and 3, it is apparent that the extent of the labels of the label 23' is greater than the extent of the label 13'. Accordingly, the label 23' will be easier to apply than the label 13' because of its greater length even though the label 23' has the same area as the label 13'.

Because a part of the forwardly projecting portion 27 of the label 23 is already delaminated from the carrier web 20, when it is desired to advance the carrier web 20 the label 23 will have less tendency to follow the carrier web 20 around the delaminator 17. Because of such partial delamination of the label 23, advance of the carrier web 20 will result in the easy release or delamination of the label 23 as it is fed toward the label applying position. When that label 23 reaches the label applying position, only the rearward or end parts of the rearwardly extending projections 31 and 32 will be adhered to the carrier web 20.

Figure 8:
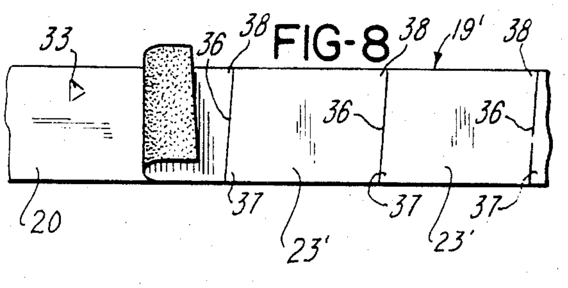
FIG. 8 is a top plan view similar to FIG. 6 but showing an alternative embodiment of the invention.

The embodiment of FIG. 8 is the same as the embodiment of FIGS. 3–7 with the exception of the rectilinear contour of bitt cuts 36. In the embodiment of FIG. 8, the butt cuts 36 are on a straight line inclined with respect to the perpendicular to the longitudinal extent of the carrier web 20 and define a single forwardly projecting portion 37 and a single rearwardly projecting portion 38. The feed cuts 33 in the carrier web 20 are registered with respect to the butt cuts 36 so that only a part of the forwardly projecting portion 37 is delaminated from the label 23' at the printing position. When that label 23' is advanced to the label applying position relative to the applicator 14, only a part of the rearwardly projecting portion remains adhered to the carrier web 20.

According to another alternative embodiment (not shown), but within the scope of the invention, the butt cuts 24 have other configurations, for example, they can be V-shaped and hence devoid of any curvature although the embodiment of FIGS. 3–7 is preferred.

The composite label web 19 is made from relatively wide composite webs such as disclosed in Jenkins U.S. Pat. No. 3,783,083 preferably using rotary cutters. The cutter blades which form the butt cuts 24 would have an undulating contour and the cutter blades would cooperate with a circular cylindrical back-up roll. The wide composite label web passing between the rotary cutters and the back-up roll would make the butt cuts progressively as the cutter and the back-up roll rotate. This results in concentration of the cutting force at the place where the label material is being cut and makes for smoother cutting action. The cutter blades which form the straight butt cuts 36 would lie along a helices.

Other embodiments and modifications of the invention will suggest themselves to those skilled in the art, and all such of these as come within the spirit of this invention are included within its scope as best defined by the appended claims.

We claim:

1. Method of applying labels from a composite label web using a labeler having a label applicator and a label delaminator, comprising the steps of: providing a longitudinally extending carrier web having an outer free end and label material releasably adhered by pressure sensitive adhesive to the carrier web, the composite label web having been wound into a roll, non-rectilinear cuts across the label material at longitudinally spaced locations defining leading and trailing edges of labels with each label having at least three projecting portions including at least one forwarded projecting portion and at least one rearwardly projecting portion with the leading edge of each label being closer to the outer free end of the carrier web than the respective trailing edge, advancing the composite label web stepwise from the roll toward the delaminator to a position in which only a part of the forwardly projecting portion of a label is delaminated from the carrier web, thereafter advancing the carrier web stepwise again to dispense the label into label applying relationship with respect to the label applicator to a position in which only a part of the rearwardly projecting portion of the label is adhered to the carrier web, and thereafter applying the label using the label applicator.

2. Method of printing and applying labels from a composite label web using a hand-held labeler having a print head, a label applicator and a label delaminator, comprising the steps of: providing a longitudinally extending carrier web having an outer free end and label material releasably adhered by pressure sensitive adhesive to the carrier web, the composite label web having been wound into a roll, non-rectilinear butt cuts across the label material at longitudinally spaced locations defining leading and trailing edges of labels with each label having at least three projecting portions including at least one forwardly projecting portion and at least one rearwardly projecting portion with the leading edge of each label being closer to the outer free end of the carrier web than the respective trailing edge, advancing the composite label web stepwise from the roll toward the delaminator to a printing position adjacent the print head in which only a part of the forwarded projecting portion of a label is delaminated from the carrier web, printing on the label at the printing position, advancing the carrier web stepwise again to dispense the printed label into label applying relationship with respect to the label applicator in which only a part of the rearwardly projecting portion of the label is adhered to the carrier web, moving the labeler and an item to be labeled relative to each other, and thereafter pressing the printed label onto the item using the label applicator and drawing the rearwardly projecting portion of the printed label free of the carrier web.

3. Method of applying labels from a composite label web using a labeler having a label applicator and a label delaminator, comprising the steps of: providing a longitudinally extending carrier web having an outer free end and label material releasably adhered by pressure sensitive adhesive to the carrier web, the composite label web having been wound into a roll, butt cuts across the label material at longitudinally spaced locations defining non-rectilinear leading and trailing edges of labels with each label having at least three projecting portions including at least one forwardly projecting portion and at least one rearwardly projecting portion with the leading edge of each label being closer to the outer free end of the carrier web than the respective trailing edge, the leading edge of each label being immediately adjacent to and complementary with the trailing edge of the adjacent label, advancing the composite label web stepwise from the roll toward the delaminator to a position in which the forwarded projecting portion of a label is adjacent the delaminator, thereafter advancing the carrier web stepwise again to dispense the label into label applying relationship with respect to the label applicator, and thereafter applying the label using the label applicator.

4. Method of applying labels from a composite label web using a labeler having a label applicator and a label delaminator, comprising the steps of: providing a longitudinally extending carrier web having an outer free end and label material releasably adhered by pressure sensitive adhesive to the carrier web, the composite web having been wound into a roll, non-rectilinear butt cuts across the label material at longitudinally spaced locations defining leading and trailing edges of labels with each label having at least three projecting portions including at least one forwardly projecting portion and at least one rearwardly projecting portion, the leading edge of each label being closer to the outer free end of the carrier web than the respective trailing edge, the leading edge of each label being immediately adjacent to and complementary with the trailing edge of the adjacent label, advancing the composite label web stepwise from the roll toward the delaminator to a position in which the rearwardly projecting portion of a label is adjacent the delaminator, advancing the carrier web stepwise again to disperse the label into label applying relationship with respect to the label applicator, and thereafter applying the label using the label applicator.

5. Method of applying labels from a composite label web using a labeler having a label applicator and a label delaminator, comprising the steps of: providing a longitudinally extending carrier web having an outer free end and label material releasably adhered by pressure sensitive adhesive to the carrier web, the composite label web having been wound into a roll, non-rectilinear butt cuts across the label material at longitudinally spaced locations defining leading and trailing edges of labels with each label having at least three projecting portions including at least one forwardly projecting portion and at least one rearwardly projecting portion with the leading edge of each label being closer to the outer free end of the carrier web than the respective trailing edge, the leading edge of each label being immediately adjacent to and complementary with the trailing edge of the adjacent label, thereafter advancing the composite label web stepwise from the roll toward the delaminator to a position in which only a part of the forwarded projecting portion of a label is delaminated from the carrier web, thereafter advancing the carrier web stepwise again to dispense the label into label applying relationship with respect to the label applicator to a position in which only a part of the rearwardly projecting portion of the label is adhered to the carrier web, and thereafter applying the label using the label applicator.

6. Method of printing and applying labels from a composite label web using a hand-held labeler having a print head, a label applicator and a label delaminator, comprising the steps of: providing a longitudinally extending carrier web having an outer free end and label material releasably adhered by pressure sensitive adhesive to the carrier web, the composite label web having been wound into a roll, butt cuts across the label material at longitudinally spaced locations defining leading and trailing edges of labels with each label having a single forwardly projecting portion and a pair of rearwardly projecting portions with the leading edge of each label being closer to the outer free end of the carrier web than the respective trailing edge, advancing the composite label web stepwise from the roll toward the delaminator to a printing position adjacent the print head in which only a part of the forwardly projecting portion of a label is delaminated from the carrier web, printing on the label at the printing position, advancing the carrier web stepwise again to dispense the printed label into label applying relationship with respect to the label applicator to a position in which only a part of each rearwardly projecting portion of the label is adhered to the carrier web, moving the labeler and an item to be labeled relative to each other, and thereafter pressing the printed label onto the item using the label applicator and drawing the rearwardly projecting portions of the printed label free of the carrier web.

7. Method of printing and applying labels from a composite label web using a hand-held labeler having a print head, a label applicator and a label delaminator, comprising the steps of: providing a longitudinally extending carrier web having an outer free end and label material releasably adhered by pressure sensitive adhesive to the carrier web, the composite label web having been wound into a roll, non-rectilinear butt cuts across the label material at longitudinally spaced locations defining leading and trailing edges of labels with each label having at least three projecting portions including at least one forwardly projecting portion and at least one rearwardly projecting portion with the leading edge of each label being closer to the outer free end of the carrier web than the respective trailing edge, advancing the composite label web stepwise from the roll toward the delaminator to a printing position adjacent the print head in which the forwardly projecting portion of a label is adjacent the delaminator, printing on the label at the printing position, thereafter advancing the carrier web stepwise again to dispense the printed label into label applying relationship with respect to the label applicator with the rearwardly projecting portion of the label adhered to the carrier web, moving the labeler and an item to be labeled relative to each other, and thereafter pressing the printed label onto the item using the label applicator and drawing the rearwardly projecting portions of the printed label free of the carrier web.

* * * * *

UNITED STATES PATENT AND TRADEMARK OFFICE

CERTIFICATE OF CORRECTION

PATENT NO. : 4,522,672

DATED : June 11, 1985

INVENTOR(S) : Eneas E. Brister et al

It is certified that error appears in the above-identified patent and that said Letters Patent are hereby corrected as shown below:

In the Title, "COMPOSITE LABEL WEB AND METHOD OF MAKING AND METHOD OF APPLYING LABELS" should be --METHOD OF APPLYING LABELS--. Column 1, line 69, "the" (second occurrence) should be --a--. Column 5, line 47, "bitt" should be --butt--. Column 7, line 45, "disperse" should be --dispense--.

Signed and Sealed this

*Fifteenth* Day of *October 1985*

[SEAL]

*Attest:*

DONALD J. QUIGG

*Attesting Officer*

*Commissioner of Patents and Trademarks—Designate*